United States Patent
Wu et al.

(10) Patent No.: US 8,085,694 B2
(45) Date of Patent: Dec. 27, 2011

(54) METHOD FOR AVOIDING UNNECESSARY EXCESSIVE STAY OF SHORT CYCLE IN DISCONTINUOUS RECEPTION MECHANISM

(75) Inventors: Chunli Wu, Beijing (CN); Tsung-Liang Lu, Taipei (TW); Yen-Chen Chen, Jhongli (TW); Chih-Wen Chang, Tainan (TW); Chien-Cheng Kuo, Tainan (TW)

(73) Assignee: Sunplus mMobile Inc., Hsinchu Science Park (TW)

( * ) Notice: Subject to any disclaimer, the term of this patent is extended or adjusted under 35 U.S.C. 154(b) by 421 days.

(21) Appl. No.: 12/382,644

(22) Filed: Mar. 20, 2009

(65) Prior Publication Data

US 2009/0238105 A1  Sep. 24, 2009

Related U.S. Application Data

(60) Provisional application No. 61/064,706, filed on Mar. 21, 2008.

(51) Int. Cl.
*H04L 7/00* (2006.01)

(52) U.S. Cl. .................................................. 370/305

(58) Field of Classification Search .................. 370/301, 370/305, 311
See application file for complete search history.

(56) References Cited

U.S. PATENT DOCUMENTS

2008/0232310 A1* 9/2008 Xu .................................. 370/329
2009/0232054 A1* 9/2009 Wang et al. .................... 370/328

OTHER PUBLICATIONS

3rd Generation Partnership Project, Technical Specification Group Radio Access Network; Evolved Universal Terrestrial Radio Access (E-UTRA) Medium Access Control (MAC) Protocol Specification, Mar. 2008, 1-30, V.8.1.0, 3GPP Organizational Partners, France.

* cited by examiner

*Primary Examiner* — Brenda H Pham
(74) *Attorney, Agent, or Firm* — Bacon & Thomas, PLLC (57) ABSTRACT

A method for avoiding unnecessary excessive stay of short cycle in discontinuous reception mechanism begins by using the short cycle while the short cycle timer is running. Then, it determines whether the inactivity timer expires or not and whether the short cycle timer expires or not. If the inactivity timer expires but the short cycle timer does not expire, the short cycle is used. If the short cycle timer expires but the inactivity timer does not expire, the long cycle is used. If the inactivity timer and the short cycle timer expire at the same time, either the short cycle or the long cycle is selected for use.

5 Claims, 8 Drawing Sheets

METHOD FOR AVOIDING UNNECESSARY EXCESSIVE STAY OF SHORT CYCLE IN DISCONTINUOUS RECEPTION MECHANISM

CROSS-REFERENCE TO RELATED APPLICATION

This application claims the benefit of the filing date of U.S. Provisional Application Ser. No. 61/064,706, entitled "A DISCONTINUOUS RECEPTION MECHANISM" filed Mar. 21, 2008, under 35 USC & 119(e)(1).

BACKGROUND OF THE INVENTION

1. Field of the Invention

The present invention relates to a discontinuous reception mechanism and, more particularly, to a method for avoiding unnecessary excessive stay of short cycle in discontinuous reception mechanism.

2. Description of Related Art

There are only two different Radio Resource Control (RRC) states, RRC_IDLE and RRC_CONNECTED, in Evolved Universal Terrestrial Radio Access (E-UTRA), unlike the four different RRC connected states adopted in Universal Mobile Telecommunication System (UMTS). In order to achieve better user equipment (UE) power saving while preventing unnecessary UE state transitions between RRC_IDLE and RRC_CONNECTED, Discontinuous Reception (DRX) is introduced in E-UTRA. In E-UTRA, generally the UE has to always monitor the Physical Downlink Control Channel (PDCCH), which informs the UE of the resource allocation, and Hybrid ARQ information related to DL-SCH and also carries the uplink scheduling grant. The introduction of DRX functionality enables UE to stop monitoring PDCCH for uplink (UL) and downlink (DL) transmission during some period of time, so that the UE only needs to be "awake" during the "active-time" duration.

In the current DRX mechanism in E-UTRA (see "E-UTRA MAC protocol specification (Release 8); 3GPP TS 36.321 V8.1.0 (2008-03); 3rd Generation Partnership Project; Technical Specification Group Radio Access Network", which is incorporated herein for reference), the UE behaviors are mainly determined by several relevant timers and/or whether some conditions are fulfilled. The timing to start and stop such timers, and corresponding UE behaviors upon the expiration of such timers are also defined.

In view of the DRX mechanism, the UE may be configured with a DRX functionality that allows it to stop monitoring PDCCH during some period of time. The DRX functionality consists of a long DRX cycle, a DRX inactivity timer, a short DRX cycle, a DRX short cycle Timer, and an on duration timer. Specifically, when a DRX cycle has been configured, the UE shall be operated according to the DRX functionality illustrated in the following Table 1.

TABLE 1

- Whenever a new DRX cycle begins (long or short), the on duration timer is started.
  :
  :
- If a DRX Command MAC control element is received:
  - stop the On Duration Timer;
  - stop the DRX Inactivity Timer.
- If the on duration timer or DRX inactivity timer is running; or
  - an UL grant for a retransmission can occur; or
  :
  :

TABLE 1-continued

- UE shall monitor the PDCCH;
- if the PDCCH is successfully decoded:
  - stop the DRX Short Cycle Timer if configured,
  - if the PDCCH indicates a DL transmission:
    - start the HARQ RTT Timer for the corresponding HARQ process;
    - stop the DRX Retransmission Timer for the corresponding HARQ process.
  - If the PDCCH indicates a new transmission (DL or UL); and
    - this is the first received PDCCH addressed to the C-RNTI or Temporary C-RNTI of the UE since successful reception of a Random Access Response is indicated; or
    - a Scheduling Request is pending; or
    - the On Duration Timer is running; or
    - the DRX Inactivity Timer is running:
      - start or restart the DRX Inactivity Timer.
  :
  :
- If the DRX Inactivity Timer expires:
  - if the short DRX cycle is configured:
    - start DRX Short Cycle Timer;
    - use the short DRX cycle;
  - else use the long DRX cycle.
- If DRX Short Cycle Timer expire:
  - use the long DRX cycle.

The current DRX mechanism covers the UE behaviors upon the start, stop and expiration of DRX-related timers, and the occurrence of other events may affect or relate to DRX. But there are still some problems left either may lead to unwanted result, or not clearly specified.

Figure 1:
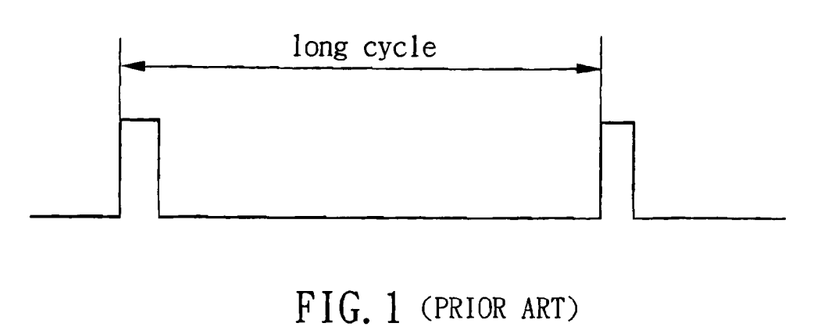
FIG. 1 schematically illustrates a long DRX cycle provided in E-UTRA DRX mechanism.
Figure 2:
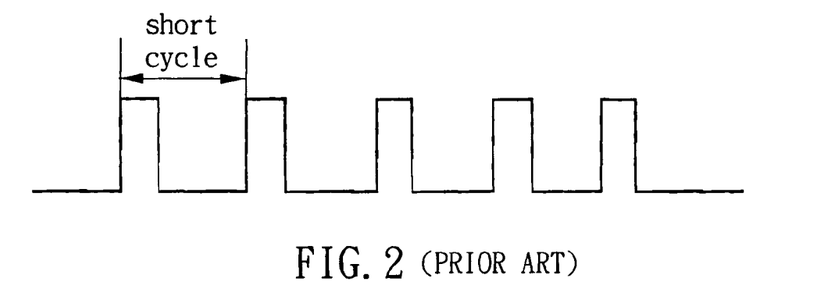
FIG. 2 schematically illustrates a short DRX cycle provided in E-UTRA DRX mechanism.
Figure 3:
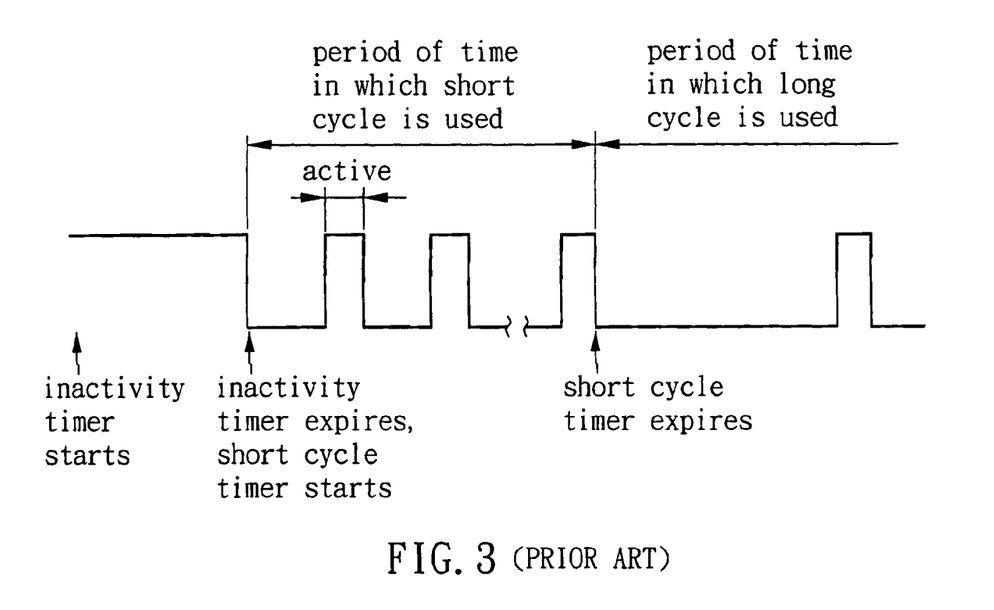
FIG. 3 schematically illustrates the cycle switching between the long DRX cycle and short DRX cycle.

Currently there are two different DRX cycles in E-UTRA DRX mechanism. As shown in FIG. 1, the indispensable long DRX cycle with which the on duration timer enables for every long period of time to provide an on duration period in which the UE is at active time to monitor PDCCH. As shown in FIG. 2, the optional short DRX cycle with which the on duration timer is on for every short period of time to provide an on duration period in which the UE is at active time to monitor PDCCH. If the short DRX cycle is configured, the switching between two cycle periods will be triggered upon the expiration of the DRX inactivity timer and the DRX short cycle timer. As shown in FIG. 3, the UE is at active time to monitor PDCCH when the DRX inactivity timer starts. When the DRX inactivity timer expires, the DRX short cycle timer is started, and short DRX cycle is used by the UE to be at active time to monitor PDCCH for every short period of time. When DRX short cycle timer expires, long DRX cycle is used by the UE to be at active time to monitor PDCCH for every long period of time.

The above procedure could work and the two DRX cycles would switch between each other when no other criterion would apply. But currently there are also other criterion will stop the DRX inactivity timer and DRX short cycle timer before they expire, e.g., the DRX inactivity timer will be immediately stopped "if a DRX command MAC control element is received", and the DRX short cycle timer is stopped whenever "the PDCCH is successfully decoded". As can be observed, it is possible now that the switching between two DRX cycles would be delayed for a long period of time, which may be unnecessary.

Figure 4:
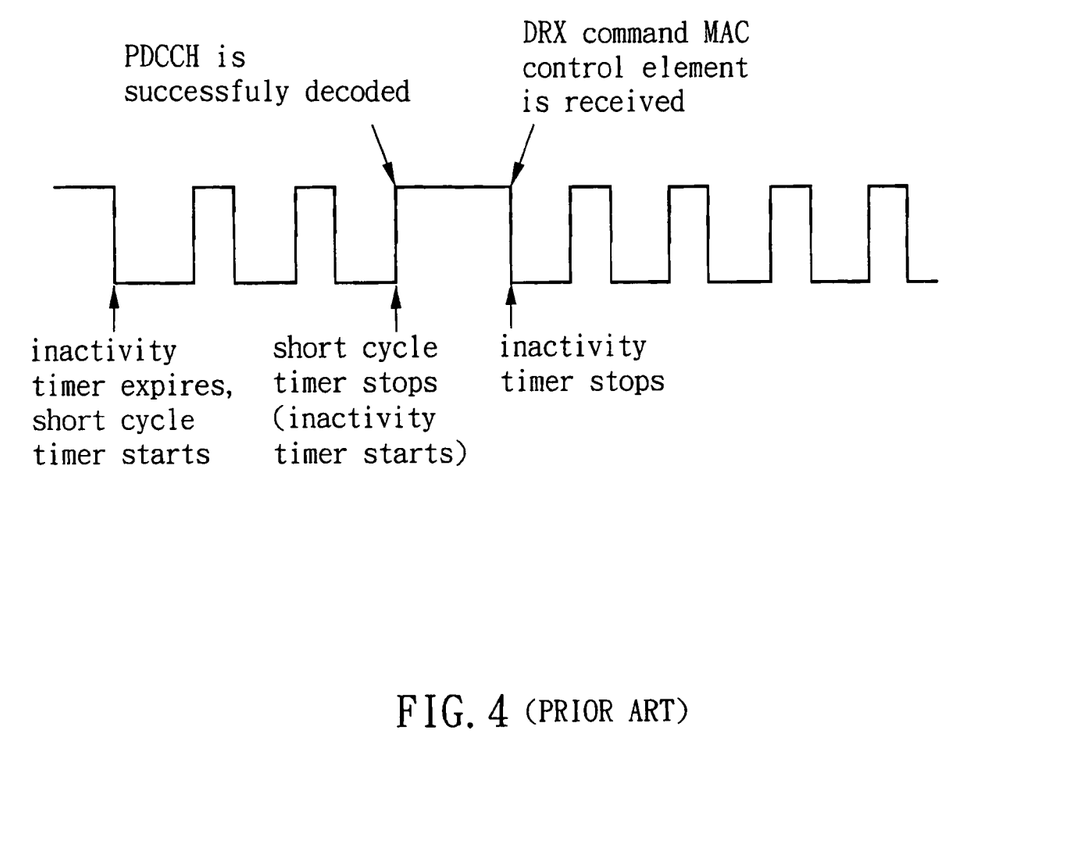
FIG. 4 schematically illustrates the problem encountered in DRX cycle switching in which the UE would stay in short DRX cycle until the expiration of the DRX short cycle timer.

As shown in FIG. 4, if the DRX inactivity timer expires, the UE will use the short DRX cycle, and start the DRX short cycle timer. The DRX short cycle timer would be stopped when the PDCCH is successfully decoded. Notice that the UE is still using short DRX cycle although the DRX short cycle timer is stopped. If a DRX command Medium Access Control (MAC) control element (CE) is received before the DRX inactivity timer expires, the DRX inactivity timer is stopped, and the DRX short cycle timer won't be restarted again. The UE would stay in short DRX cycle until the expiration of the DRX short cycle timer, which may occur when the DRX inactivity timer starts due to the occurrence of a new data transmission and then expires to restart the DRX short cycle timer. Accordingly, the UE may stay in short DRX cycle for a long period of time if no new data transmission occurs between the network and the UE since the DRX inactivity timer would not be restarted. This could be a waste of UE power since the UE should better stay in long DRX cycle to avoid unnecessary wake-up in such situation.

Therefore, it is desirable to provide an improved method for avoiding unnecessary excessive stay of short cycle in discontinuous reception mechanism to mitigate and/or obviate the aforementioned problems.

SUMMARY OF THE INVENTION

The object of the present invention is to provide a method for avoiding unnecessary excessive stay of short cycle in discontinuous reception mechanism, so as to eliminate the aforementioned problems.

According to one aspect, the present invention which achieves the object relates to a method for avoiding unnecessary excessive stay of short cycle in discontinuous reception mechanism applied in E-UTRA network environment, with which a user equipment behaves according to an inactivity timer and a short cycle timer so that the user equipment is at active time to monitor PDCCH when the inactivity timer is running, starts the short cycle timer and uses a short cycle when the inactivity timer expires, and uses a long cycle when the short cycle timer expires, in which the user equipment is at the active time to monitor the PDCCH for every short period of time by the short cycle and at the active time to monitor the PDCCH for every long period of time by the long cycle, wherein the inactivity timer is stopped when the user equipment receives a discontinuous reception (DRX) command MAC control element while the short cycle timer never stops before expiration. The method comprises the steps of: (A) using the short cycle by the user equipment while the short cycle timer is running; (B) determining whether the inactivity timer expires or not and whether the short cycle timer expires or not; (C) using the short cycle when the inactivity timer expires but the short cycle timer does not expire; (D) using the long cycle when the short cycle timer expires but the inactivity timer does not expire; and (E) selecting the short cycle or the long cycle for use when the inactivity timer and the short cycle timer expire at the same time.

According to another aspect, the present invention which achieves the object relates to a method for avoiding unnecessary excessive stay of short cycle in discontinuous reception mechanism applied in E-UTRA network environment, with which a user equipment behaves according to an inactivity timer and a short cycle timer so that the user equipment is at active time to monitor PDCCH when the inactivity timer is running, starts the short cycle timer and uses a short cycle when the inactivity timer expires, and uses a long cycle when the short cycle timer expires, in which the user equipment is at the active time to monitor the PDCCH for every short period of time when using the short cycle and at the active time to monitor the PDCCH for every long period of time by the long cycle. The method comprises the steps of: (A) determining by the user equipment whether the inactivity timer is stopped before expiration, and if yes, executing step (B), otherwise executing step (D); (B) determining whether the short cycle is configured, and if yes, using the short cycle and starting the short cycle timer and then executing step (D), otherwise executing step (C); (C) using the long cycle; and (D) performing the discontinuous reception mechanism for determining whether to monitor the PDCCH or not.

According to a further aspect, the present invention which achieves the object relates to a method for avoiding unnecessary excessive stay of short cycle in discontinuous reception mechanism applied in E-UTRA network environment, with which a user equipment behaves according to an inactivity timer and a short cycle timer so that the user equipment is at active time to monitor PDCCH when the inactivity timer is running, starts the short cycle timer and uses a short cycle when the inactivity timer expires, and uses a long cycle when the short cycle timer expires, in which the user equipment is at the active time to monitor the PDCCH for every short period of time by the short cycle and at the active time to monitor the PDCCH for every long period of time by the long cycle, wherein the inactivity timer is stopped when the user equipment receives a discontinuous reception (DRX) command MAC control element. The method comprises the steps of: (A) determining by the user equipment whether said DRX command MAC control element is received, and if yes executing step (B), otherwise executing step (E); (B) stopping the inactivity timer; (C) determining whether the short cycle is configured, and if yes, using the short cycle and starting the short cycle timer and then executing step (E), otherwise executing step (D); (D) using the long cycle; and (E) performing the discontinuous reception mechanism for determining whether to monitor the PDCCH or not.

Other objects, advantages, and novel features of the invention will become more apparent from the following detailed description when taken in conjunction with the accompanying drawings.

DETAILED DESCRIPTION OF THE PREFERRED EMBODIMENT

Reference will now be made in detail to present embodiments of the present invention, examples of which are illustrated in the accompanying drawings. Wherever possible, the same reference numbers will be used throughout the drawings to refer to the same or like parts.

Figure 5:
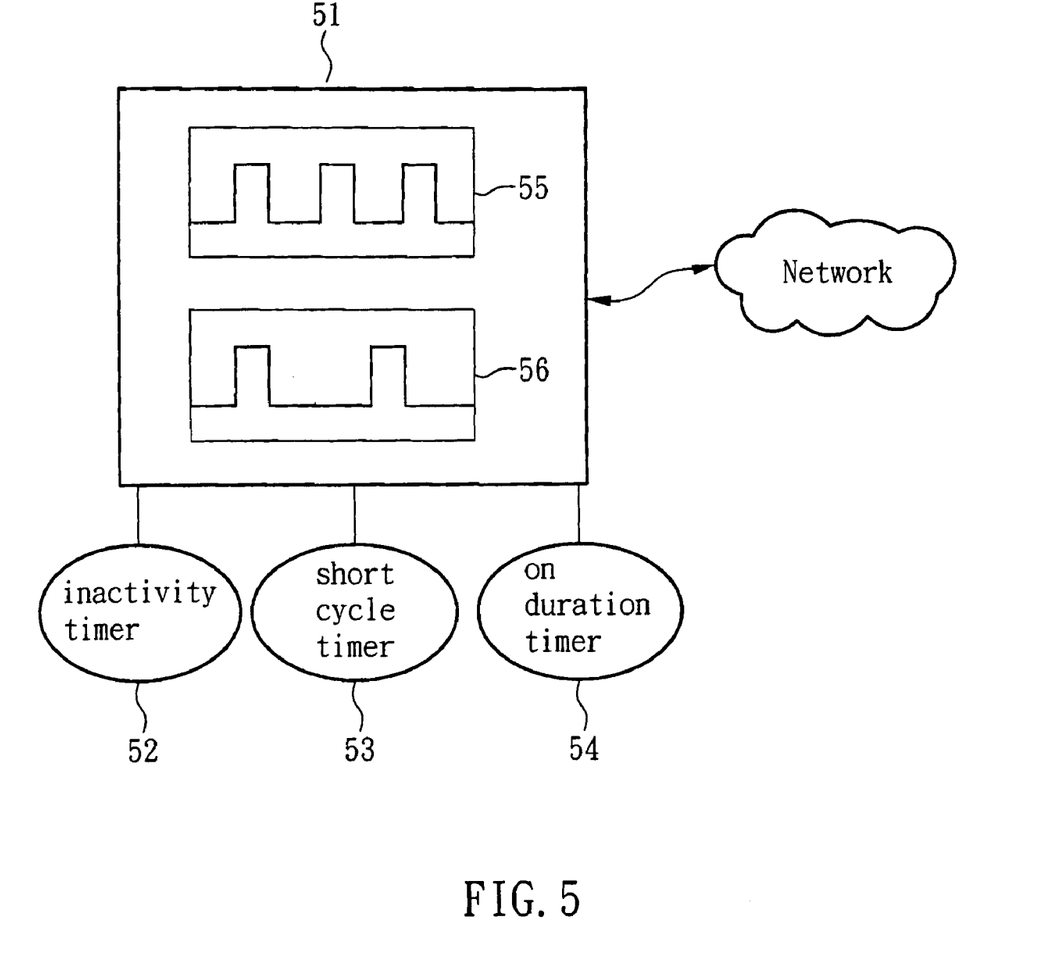
FIG. 5 schematically illustrates an E-UTRA network environment executed therein the method for avoiding unnecessary excessive stay of short cycle in discontinuous reception mechanism.

FIG. 5 schematically illustrates an E-UTRA network environment executed therein a method for avoiding unnecessary excessive stay of short cycle in discontinuous reception (DRX) mechanism with which a user equipment (UE) 51 behaves according to an inactivity timer 52, a short cycle timer 53, an on duration timer 54 and predetermined conditions to be fulfilled. Based on the discontinuous reception mechanism, the user equipment 51 is at active time to monitor PDCCH when the inactivity timer 52 is running. Further, the discontinuous reception mechanism provides a long cycle 56 in which the user equipment 51 is at active time to monitor PDCCH for every long period of time, and optionally provides a short cycle 55 in which the user equipment 51 is at active time to monitor PDCCH for every short period of time. When the short cycle 55 is configured in the user equipment 51 and the network side, the user equipment 51 can use the short cycle.

When the inactivity timer 52 expires, the user equipment 51 starts the short cycle timer 53 and uses the short cycle 55. In using the short cycle 55, the on duration timer 54 enables for every short period of time to provide an on duration period in which the user equipment 51 is at active time to monitor PDCCH. When the short cycle timer 53 expires, the user equipment 51 uses a long cycle 56. In using the long cycle 56, the on duration timer 54 enables for every long period of time to provide an on duration period in which the UE is at active time to monitor PDCCH.

When the PDCCH is successfully decoded, the short cycle timer 53 is stopped and the inactivity timer 52 starts, while the user equipment 51 is still using the short cycle 55. If a DRX command Medium Access Control (MAC) control element is received before the inactivity timer 52 expires, the inactivity timer 52 is stopped, and the short cycle timer 53 won't be restarted again with result that the user equipment 51 would stay in the short cycle 55 for a long period of time.

Figure 6:
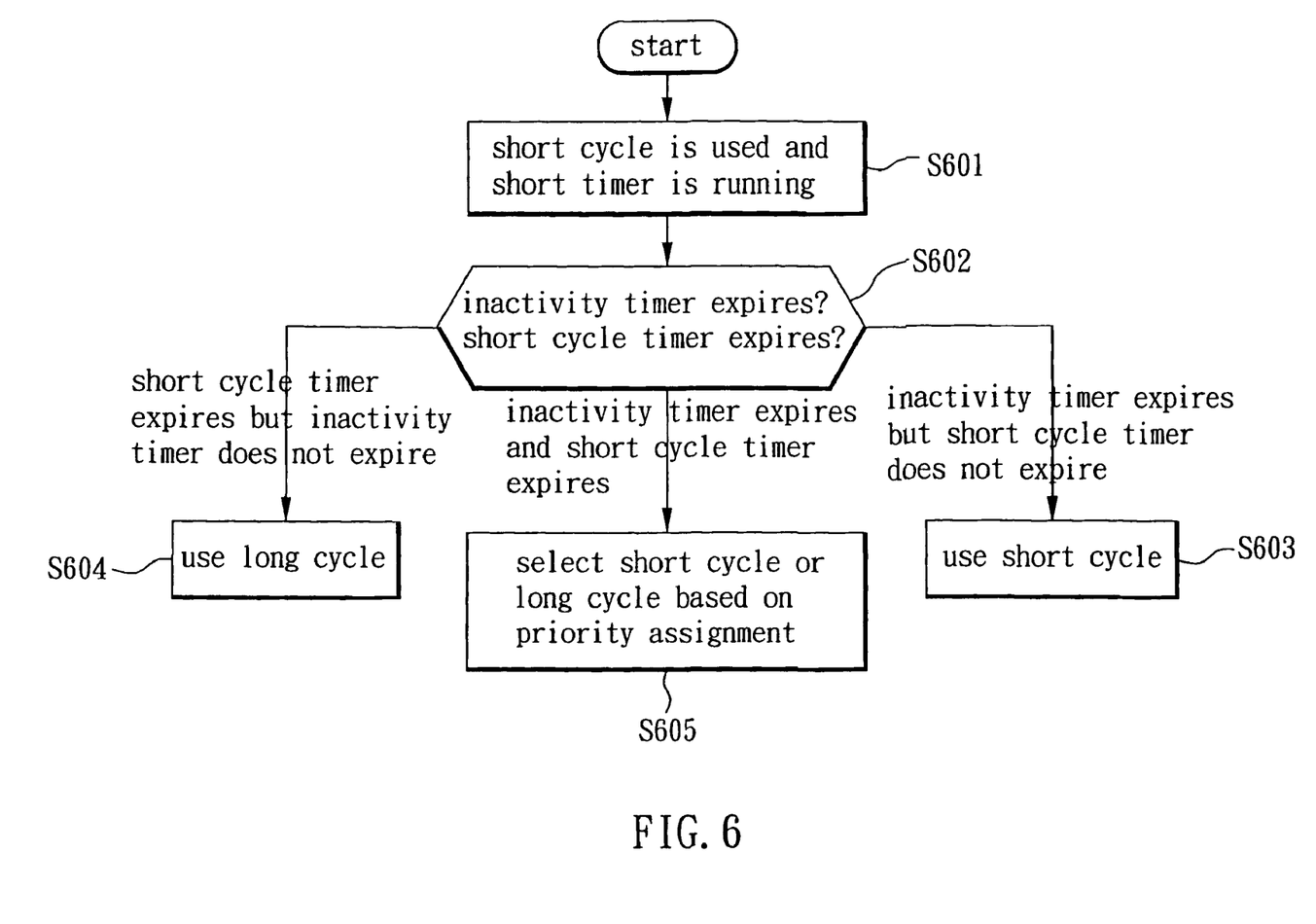
FIG. 6 is the flow chart of the method for avoiding unnecessary excessive stay of short cycle in discontinuous reception mechanism in accordance with a first embodiment of the invention.

To avoid such excessive stay of short cycle, FIG. 6 illustrates the flow chart of a first embodiment of the method for avoiding unnecessary excessive stay of short cycle in discontinuous reception mechanism with which the short cycle timer 53 never stops before expiration. In the method, at first, the user equipment 51 uses the short cycle 55 while the short cycle timer 53 is running (step S601). Then, it determines whether the inactivity timer 52 expires or not and whether the short cycle timer 53 expires or not (step S602). If the inactivity timer 52 expires but the short cycle timer 53 does not expire, the user equipment 51 uses the short cycle 55 (step S603). If the short cycle timer 53 expires but the inactivity timer 52 does not expire, the user equipment 51 uses the long cycle 55 (step S604). If the inactivity timer 52 and the short cycle timer 53 expire at the same time, the user equipment 51 selects the short cycle 55 or the long cycle 56 for use based on a priority assignment (step S605). That is, when the short cycle 55 has a priority higher than that of the long cycle 56, the user equipment 51 uses the short cycle 55 and the short cycle timer 53 is started if the inactivity timer 52 and the short cycle timer 53 expire at the same time. On the contrary, when the long cycle 56 has a priority higher than that of the short cycle 55, the user equipment 51 uses the long cycle 56 due to the inactivity timer 52 and the short cycle timer 53 expire at the same time.

According to the above method, the short cycle timer 53 does not stop before expiration, even when the PDCCH is successfully decoded, which may encounter simultaneous expiration of the inactivity timer 52 and the short cycle timer 53. Therefore, the user equipment 51 will use either the short cycle 55 or the long cycle 56 when the inactivity timer 52 and the short cycle timer 53 expire at the same time. Thereby, excessive stay of short cycle will be successfully avoided by the user equipment.

Figure 7:
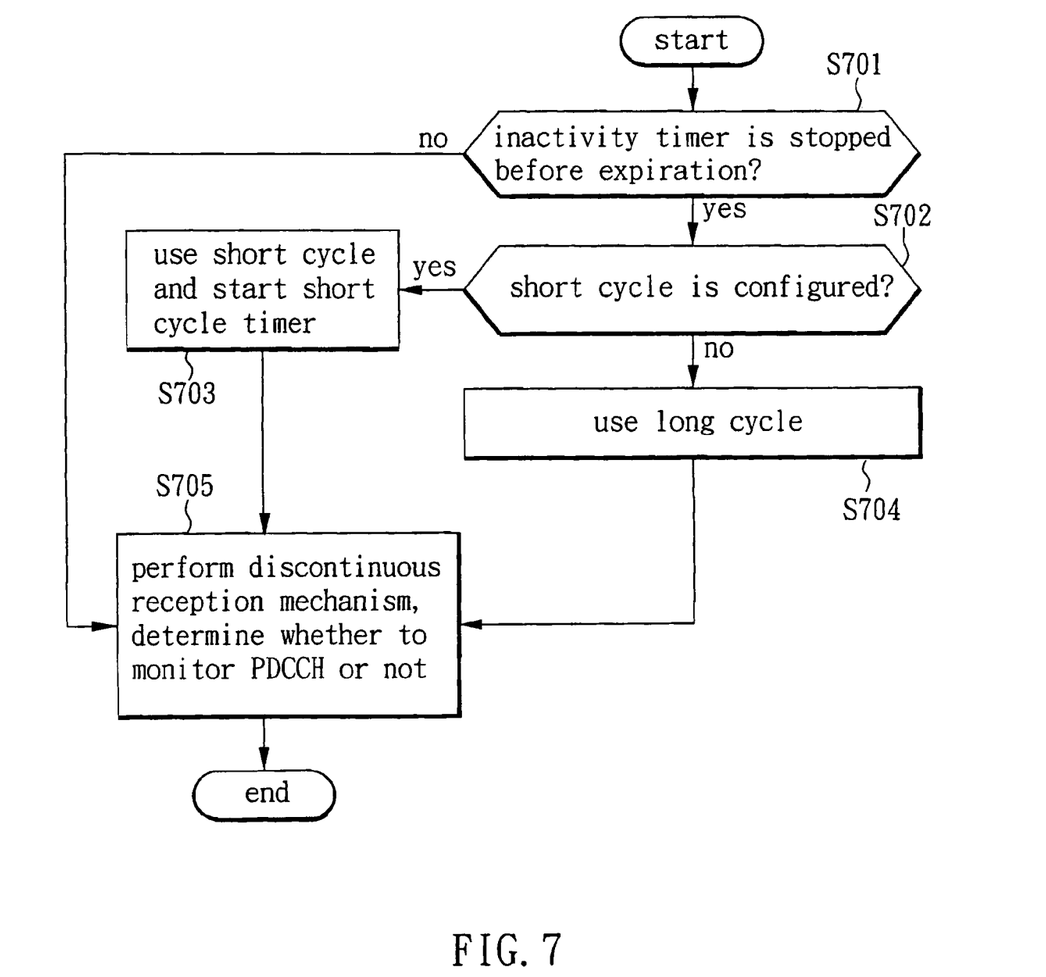
FIG. 7 is the flow chart of the method for avoiding unnecessary excessive stay of short cycle in discontinuous reception mechanism in accordance with a second embodiment of the invention.

With reference to FIG. 7, there is shown the flow chart of a method for avoiding unnecessary excessive stay of short cycle in discontinuous reception mechanism in accordance with a second embodiment of the present invention. As shown, the method begins by determining whether the inactivity timer 52 is stopped before expiration (step S701). If the inactivity timer 52 is not stopped before expiration, process goes to step S705 for performing the discontinuous reception mechanism for determining whether to monitor PDCCH or not. If the inactivity timer 52 is stopped before expiration, it further determines whether the short cycle 55 is configured (step S702) or not. If the short cycle 55 is configured, the user equipment 51 uses the short cycle 55 and enables the short cycle timer 53 (step S703) and then process goes to step S705 for performing the discontinuous reception mechanism for determining whether to monitor PDCCH or not. On the contrary, if the short cycle 55 is not configured, the user equipment 51 uses the long cycle 56 (step S704) and then process goes to step S705 for performing the discontinuous reception mechanism for determining whether to monitor PDCCH or not.

With the above method, once the inactivity timer 52 is stopped before expiration, the short cycle timer 53 shall be enabled if the short cycle 55 is configured. Thus, the short cycle timer 53 and the inactivity timer 52 will not be stopped concurrently, so that the problem of user equipment's excessive stay of short cycle can be eliminated.

Figure 8:
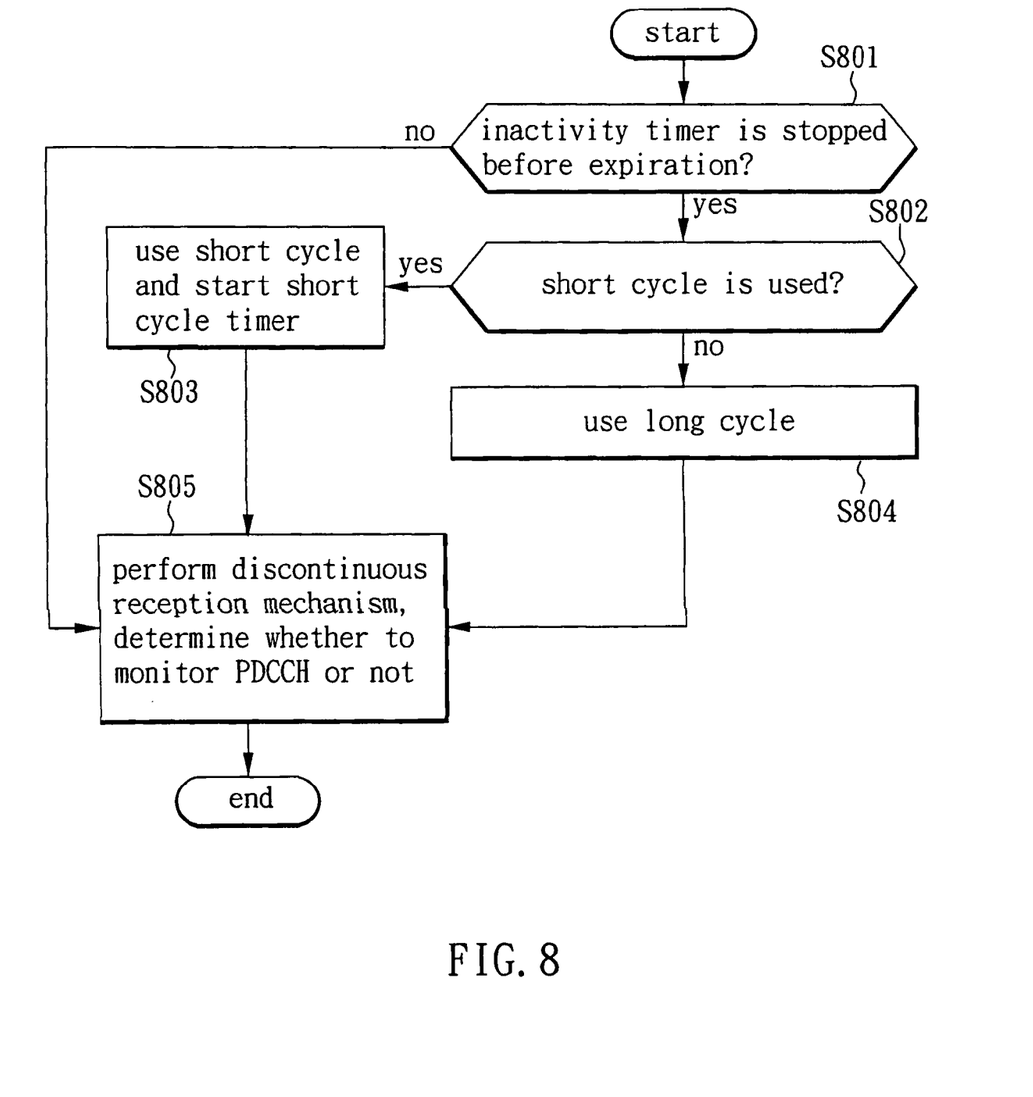
FIG. 8 is the flow chart of the method for avoiding unnecessary excessive stay of short cycle in discontinuous reception mechanism in accordance with a third embodiment of the invention.

With reference to FIG. 8, there is shown the flow chart of a method for avoiding unnecessary excessive stay of short cycle in discontinuous reception mechanism in accordance with a third embodiment of the present invention. As shown, the method begins by determining whether the inactivity timer 52 is stopped before expiration (step S801). If the inactivity timer 52 is not stopped before expiration, process goes to step S805 for performing the discontinuous reception mechanism for determining whether to monitor PDCCH or not. If the inactivity timer 52 is stopped before expiration, it further determines whether the short cycle 55 is used (step S802) or not. If the short cycle 55 is used, the user equipment 51 uses the short cycle 55 and starts the short cycle timer 53 (step S803) and then process goes to step S805 for performing the discontinuous reception mechanism for determining whether to monitor PDCCH or not. On the contrary, if the short cycle 55 is not used, the user equipment 51 uses the long cycle 56 (step S803) and then process goes to step S805 for performing the discontinuous reception mechanism for determining whether to monitor PDCCH or not.

With the above method, once the inactivity timer 52 is stopped before expiration, the short cycle timer 53 shall be started if the short cycle 55 is used. Thus, the short cycle timer 53 and the inactivity timer 52 will not be stopped concurrently, so that the problem of user equipment's excessive stay of short cycle can be eliminated.

Figure 9:
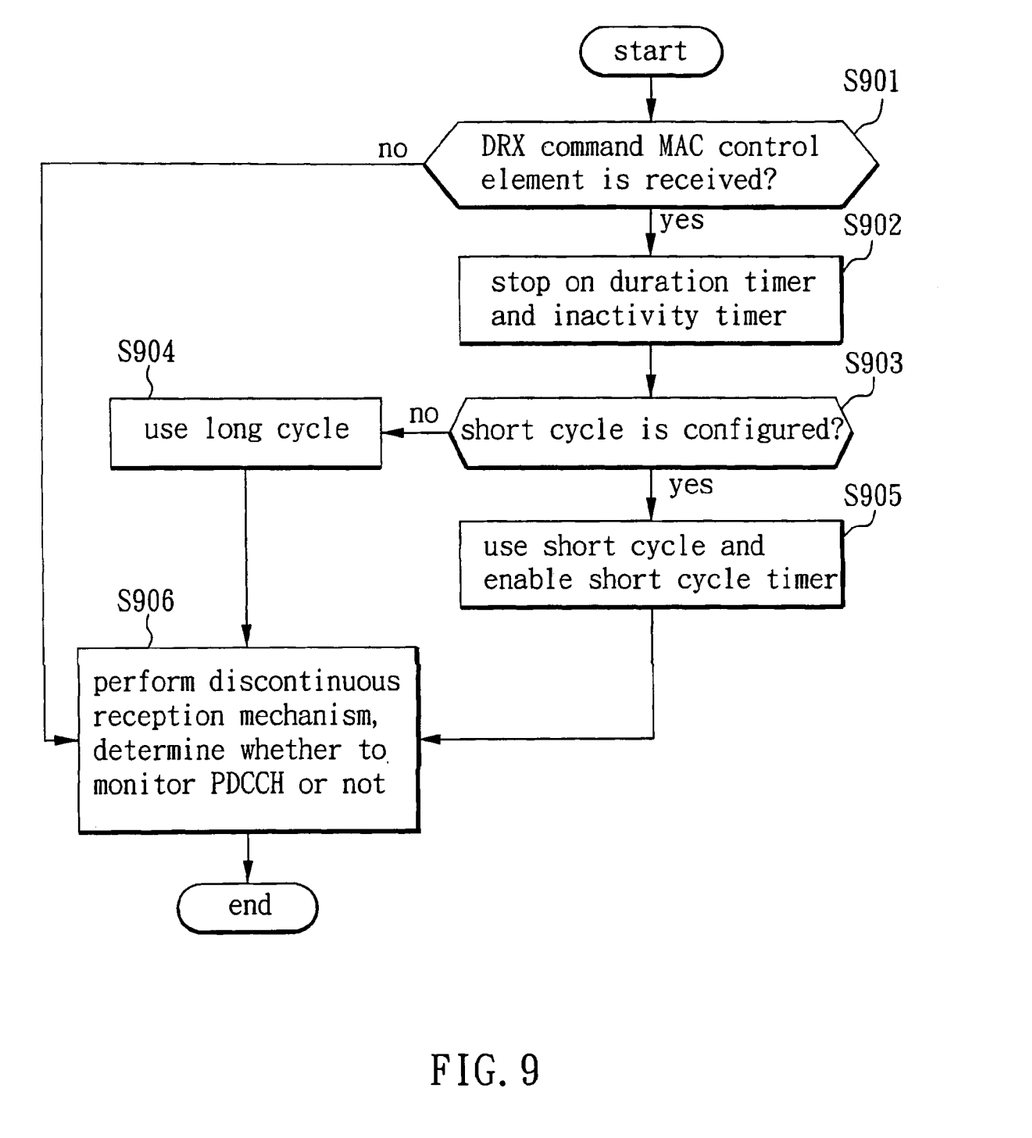
FIG. 9 is the flow chart of the method for avoiding unnecessary excessive stay of short cycle in discontinuous reception mechanism in accordance with a fourth embodiment of the invention.

With reference to FIG. 9, there is shown the flow chart of a method for avoiding unnecessary excessive stay of short cycle in discontinuous reception mechanism in accordance with a fourth embodiment of the present invention. As shown, the method begins by first determining whether a DRX command MAC control element is received (step S901). If no DRX command MAC control element is received, process goes to step S906 for performing the discontinuous reception mechanism for determining whether to monitor PDCCH or not. If there is a DRX command MAC control element received, step S902 is executed to stop the on duration timer 54 and the inactivity timer 52. Then, it determines whether the short cycle 55 is configured or not (step S903). If the short cycle 55 is not configured, the user equipment 51 uses the long cycle 56 (step S904), and the process goes to step S906 for performing the discontinuous reception mechanism for determining whether to monitor PDCCH or not. If the short cycle 55 is configured, the user equipment 51 uses the short cycle 55 and starts the short cycle timer 53 (step S905), and then the process goes to step S906 for performing the discontinuous reception mechanism for determining whether to monitor PDCCH or not.

With the above method, once the inactivity timer 52 is stopped due to receiving a DRX command MAC control element, the short cycle timer 53 shall be started if the short cycle 55 is configured. Thus, the short cycle timer 53 and the inactivity timer 52 will not be stopped concurrently, so that the problem of user equipment's excessive stay of short cycle can be eliminated.

Figure 10:
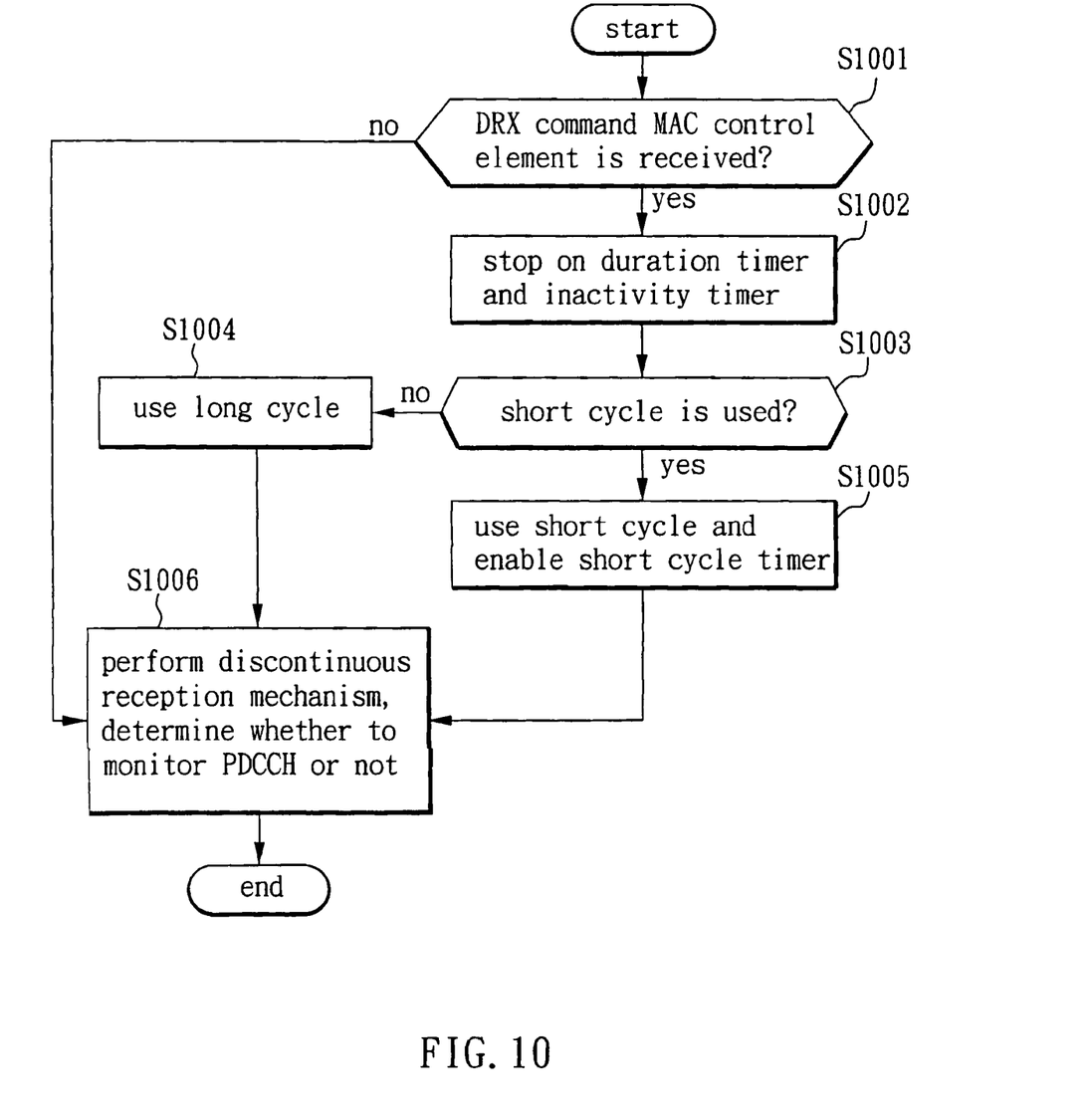
FIG. 10 is the flow chart of the method for avoiding unnecessary excessive stay of short cycle in discontinuous reception mechanism in accordance with a fifth embodiment of the invention.

With reference to FIG. 10, there is shown the flow chart of a method for avoiding unnecessary excessive stay of short cycle in discontinuous reception mechanism in accordance with a fifth embodiment of the present invention. As shown, the method begins by first determining whether a DRX command MAC control element is received (step S1001). If no DRX command MAC control element is received, process goes to step 1006 for performing the discontinuous reception mechanism for determining whether to monitor PDCCH or not. If there is a DRX command MAC control element received, step S1002 is executed to stop the on duration timer 54 and the inactivity timer 52. Then, it determines whether the short cycle 55 is used or not (step S1003). If the short cycle 55 is not used, the user equipment 51 uses the long cycle 56 (step S1004), and the process goes to step S1006 for performing the discontinuous reception mechanism for determining whether to monitor PDCCH or not. If the short cycle 55 is used, the user equipment 51 uses the short cycle 55 and starts the short cycle timer 53 (step S1005), and then the process goes to step S1006 for performing the discontinuous reception mechanism for determining whether to monitor PDCCH or not.

With the above method, once the inactivity timer 52 is stopped due to receiving a DRX command MAC control element, the short cycle timer 53 shall be started if the short cycle 55 is used. Thus, the short cycle timer 53 and the inactivity timer 52 will not be stopped concurrently, so that the problem of user equipment's excessive stay of short cycle can be eliminated.

In view of the foregoing, it is known that the present invention is design to make the short cycle timer never stop before expiration and enable the user equipment to select the short cycle or the long cycle for use when the inactivity timer and the short cycle timer expire at the same time, so as to successfully avoid excessive stay of short cycle; or to enable the short cycle timer when the inactivity timer is stopped before expiration so that the short cycle timer and the inactivity timer will not be stopped concurrently thereby successfully avoiding excessive stay of short cycle; or to start the short cycle timer when the inactivity timer is stopped due to receiving a DRX command MAC control element so that the short cycle timer and the inactivity timer will not be stopped concurrently thereby successfully avoiding excessive stay of short cycle. Accordingly, it is able to eliminate the problem, encountered in the convention skill, that the user equipment may stay in short cycle for a long time and the power consumption is wasted.

Although the present invention has been explained in relation to its preferred embodiment, it is to be understood that many other possible modifications and variations can be made without departing from the spirit and scope of the invention as hereinafter claimed.

What is claimed is:

1. A method for avoiding unnecessary excessive stay of short cycle in discontinuous reception mechanism applied in E-UTRA network environment, with which a user equipment behaves according to an inactivity timer and a short cycle timer so that the user equipment is at active time to monitor PDCCH when the inactivity timer is running, starts the short cycle timer and uses a short cycle when the inactivity timer expires, and uses a long cycle when the short cycle timer expires, in which the user equipment is at the active time to monitor the PDCCH for every short period of time by the short cycle and at the active time to monitor the PDCCH for every long period of time by the long cycle, wherein the inactivity timer is stopped when the user equipment receives a discontinuous reception (DRX) command MAC control element while the short cycle timer never stops before expiration, the method comprising the steps of:
   (A) using the short cycle by the user equipment while the short cycle timer is running;
   (B) determining whether the inactivity timer expires or not and whether the short cycle timer expires or not;
   (C) using the short cycle when the inactivity timer expires but the short cycle timer does not expire;
   (D) using the long cycle when the short cycle timer expires but the inactivity timer does not expire; and
   (E) selecting the short cycle or the long cycle for use when the inactivity timer and the short cycle timer expire at the same time.

2. The method as claimed in claim 1, wherein in step (E), the short cycle is used while the short cycle timer is enabled when the inactivity timer and the short cycle timer expire at the same time.

3. The method as claimed in claim 2, wherein in using the long cycle, an on duration timer is on for every said long period of time to provide an on duration period in which the user equipment is at the active time to monitor the PDCCH, and in using the short cycle, the on duration timer enables for every said short period of time to provide an on duration period in which the user equipment is at the active time to monitor the PDCCH.

4. The method as claimed in claim 1, wherein in step (E), the long cycle is used when the inactivity timer and the short cycle timer expire at the same time.

5. The method as claimed in claim 4, wherein in using the long cycle, an on duration timer enables for every said long period of time to provide an on duration period in which the user equipment is at the active time to monitor the PDCCH, and in using the short cycle, the on duration timer enables for every said short period of time to provide the on duration period in which the user equipment is at the active time to monitor the PDCCH.

* * * * *